United States Patent
Kadam et al.

(10) Patent No.: US 10,116,451 B2
(45) Date of Patent: Oct. 30, 2018

(54) FILE BACKUPS USING A TRUSTED STORAGE REGION

(71) Applicant: Intel Corporation, Santa Clara, CA (US)

(72) Inventors: Akshay Ramesh Kadam, Bangalore (IN); Vishnuvarthanan Balraj, Folsom, CA (US); Alex Nayshtut, Gan Yavne, D (IL)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/349,410

(22) Filed: Nov. 11, 2016

(65) Prior Publication Data

US 2018/0139053 A1 May 17, 2018

(51) Int. Cl.
| | |
|---|---|
| *G06F 11/30* | (2006.01) |
| *G06F 21/00* | (2013.01) |
| *H04L 9/32* | (2006.01) |
| *G06F 3/06* | (2006.01) |
| *G06F 11/14* | (2006.01) |

(52) U.S. Cl.
CPC .......... *H04L 9/3247* (2013.01); *G06F 3/0622* (2013.01); *G06F 3/0643* (2013.01); *G06F 3/0644* (2013.01); *G06F 3/0659* (2013.01); *G06F 3/0673* (2013.01); *G06F 11/1451* (2013.01); *G06F 11/1469* (2013.01)

(58) Field of Classification Search
None
See application file for complete search history.

(56) References Cited

U.S. PATENT DOCUMENTS

| | | | | |
|---|---|---|---|---|
| 5,835,594 | A * | 11/1998 | Albrecht | G06F 12/1466 713/187 |
| 9,563,789 | B1 * | 2/2017 | Thomas | G06F 21/6218 |
| 2005/0283662 | A1 * | 12/2005 | Li | G06F 21/6209 714/13 |

* cited by examiner

*Primary Examiner* — Fatoumata Traore
(74) *Attorney, Agent, or Firm* — Schwegman Lundberg & Woessner, P.A.

(57) ABSTRACT

A storage device is divided into a trusted storage region (TSR) and a standard storage region (SSR). A backup and recovery tool (BRT) is used to generate a public/private key pair and provide the public key to the storage device. The BRT detects a trigger to back up a file from the SSR to the TSR and sends a write instruction to the storage device to perform the backup. The BRT signs the write instruction with the private key. The storage device uses the public key to verify the write instruction and performs the backup based on the verification. The TSR cannot be accessed without the private key, therefore if a malware attack is detected in the storage device, the device may be formatted to delete infected files. A fresh operating system may be installed on the formatted storage device and the file may be recovered from the TSR.

22 Claims, 9 Drawing Sheets

US 10,116,451 B2

FILE BACKUPS USING A TRUSTED STORAGE REGION

TECHNICAL FIELD

Embodiments described herein generally relate to information processing and security, more particularly, to using a trusted storage region of a storage device to backup files for recovery after a malware attack or other disaster recovery situation.

BACKGROUND

Computing systems, such as desktop or portable devices, are vulnerable to attacks from viruses, worms, ransomware or other forms of malware. Data stored in a memory of a computing system may be subject to various types of undesired modification (e.g., encryption) if targeted by one of these attacks. Since software is typically modified only during a system installation or a software upgrade, protections are sometimes put in place to eliminate the threat to software stored in system memory during these operations. For example, a protected region, known as an "enclave", within the software's address space. System hardware/firmware provides confidentiality and integrity for data and/or operations in an enclave, even from privileged malware attacks. For example, through cryptography and hardware isolation of memory associated with the enclave. However, file system data is often generated locally by users and routinely modified thereafter. This makes such file system data especially vulnerable to infection via a malware attack. For example, malware may infect a file system as a result of being downloaded to a computer through sites offering free software, file sharing sites and/or legitimate sites that have been hacked. In other words, the users download and run malicious programs voluntarily, thinking that legitimate software is being installed on their devices.

Ransomware refers to malicious processes or programs that block or otherwise interfere with a user's interaction with the operating system or the file system (which normally includes most of a user's data) of a computing device, such as a desktop computer, a smartphone, a tablet or other such devices. These malicious processes or programs may then demand (e.g., in a message shown on a display) a transfer of funds to the distributers of the offending process or program in exchange for restoration of the functionality of the computing device's operating system or the file system including the user's data. An example sequence of events during a ransomware attack is as follows. Once admitted into the system (e.g., downloaded by a user) the malicious program may block the user's interaction with the data in the file system by encrypting the files so that the user cannot read the files). The malicious program then displays, e.g., on all graphical user interfaces, a message that the data in the file system has been encrypted together with instructions for decrypting it. In the instructions, there is usually a demand for payment that must be provided before an encryption key needed to unlock the computing device may be provided to the user.

Some users may try to protect themselves by constantly backing-up their data. However, most data backup solutions are designed with a disaster recover use case in mind. Whether the data is backed-up in offsite servers or in cloud-based storage services, there is no consideration given to whether the backed-up data is clean and may be safely restored at any time. Therefore, the ransomware attack may easily infect the backup data by repeatedly encrypting the file system data and triggering a back-up of the data, this may easily lead to the point where all the versions of the data in the back-up are encrypted as well.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

System Architecture

Embodiments described herein are directed to ransomware-proof local back-ups that allow for safe recovery of system data that has been attacked by ransomware (or other similar malware), without having to pay the distributers of the ransomware any ransom. In some embodiments, a trusted storage region (TSR) is used for protecting the backed-up data. A TSR is section of memory (e.g., of a storage device) that is protected by a combination of hardware, software, and firmware in order to provide a safe environment for storing data (e.g., user file system data) and for executing signed and verified executable objects (e.g., a write instruction signed with a private key). The TSR may comprise a special memory "enclave", which are protected areas of execution. Application code can be put into an enclave by special instructions and software, such as the Intel® Software Guard Extensions (SGX) for the x86 processor architecture made available to application developers via the Intel® SGX SDK. The Intel SGX SDK is a collection of APIs, libraries, documentation, sample source code, and tools that allows software developers to create and debug Intel SGX enabled applications.

In particular, a backup and replacement tool (BRT) application may execute within an enclave when it interacts with the TSR. The BRT can execute and issue read/write instructions which are provided with hardware protection (e.g., a protected instruction channel) for secure application execution. Furthermore, in some embodiments, the TSR is configured to execute only objects that are properly cryptographically signed, such as write instructions signed by a private key of a private/public key pair generated by the BRT. Any attempt to access the TSR with other (non-signed) instructions may result in an error such as a page fault. This helps to ensure that malware and other malicious objects are not executed within the TSR since the malware does not have access to the private key.

Figure 1:
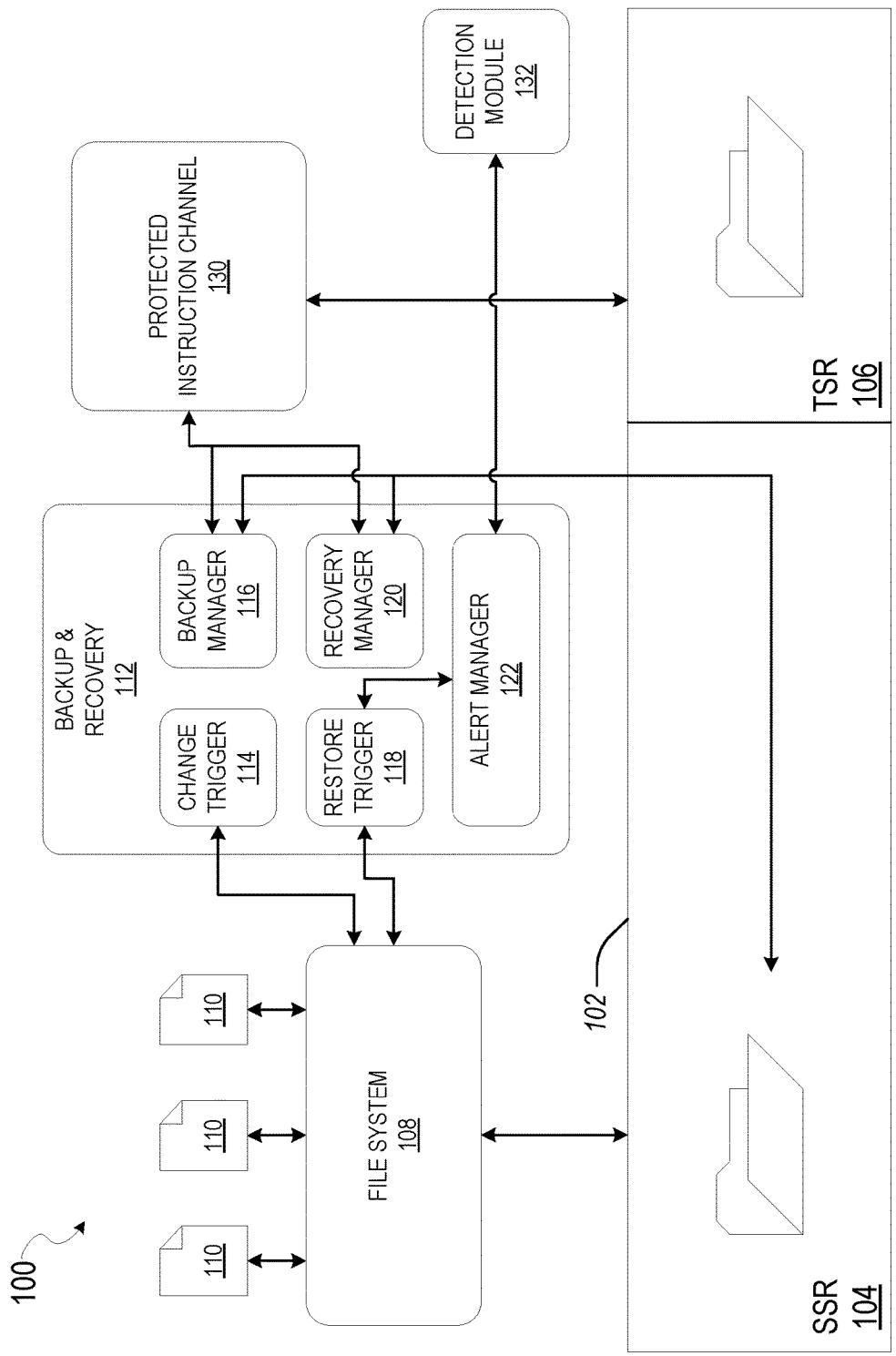
FIG. 1 is a block diagram illustrating a data flow of a system, consistent with some embodiments, configured to use a trusted storage region to backup file data.

FIG. 1 is a block diagram illustrating a data flow of a system 100, consistent with some embodiments, configured to use a trusted storage region to backup file data.

During provisioning (e.g., the initial setup and configuration of the system) a BRT 112 generates a private/public key pair. According to other embodiments, the key pair may be generated at other times. For example, the private/public key pair may be generated each time the system 100 powers up. Additionally or alternatively, the key pair may be repeatedly generated, at periodic or random time intervals, to impede discovery of the private and public keys. Furthermore, the key pair may even be repeatedly generated at a rate that makes attacking the protected system 100 impractical. The private key and the corresponding public key may be, for example, based on a random, non-predictable key pair.

During the provisioning (or other instance of key generation) the BRT 112 provides the public key to a storage device 102 that includes a standard storage region (SSR) 104 and a TSR 106. The TSR 106 cannot be written (including erasing) by an instruction that is not signed using the private key. Furthermore, as noted above the TSR 106 may also be protected from being accessed by hardware and/or firmware of storage device 102. For example, the TSR 106 could be impossible to format (which would erase all data in the TSR 106) by an operating system (OS) installed on the storage device 102.

During normal operation, a change trigger module 114 of the BRT 112 may detect a trigger to back up a file 110 of the file system 108 stored in SSR 104, of storage device 102, to the TSR 106. The trigger to back up the file 110 may be a change to the file 110 in the SSR 104 (e.g., change in data or name of file 110) or the trigger may be the passing of a specified time period since the file 110 was last backed-up from the SSR 104 to the TSR 106.

The backup manager module 116 then generates a write instruction to the storage device 102 to back up the file 110 to the TSR 106. The backup manager module 116 signs the write instruction with the private key generated earlier by BRT 112. The backup manager module 116 then sends the write instruction to the storage device 102 which uses the public key to verify the authenticity of the write instruction received from the BRT 112 via backup manager module 116. For example, storage device 102 may include a memory controller (not shown), that is suitable for this verification purpose.

In some embodiments, the BRT 112 may be configured to execute within an enclave (e.g., Intel® Software Guard Extensions (SGX) for the x86 processor architecture) and access the TSR 106 of storage device 102 via a protected instruction channel 130. The protected instruction channel 130 may provide confidentiality and integrity protection to the private key, during runtime execution of the BRT to issue the write instruction, using hardware and/or firmware of the system 100. For example, the protected instruction channel 130 may be a cryptographically protected channel (enforced by hardware and/or firmware of system 100) between the BRT 112 and the storage device 102.

After the storage device 102 uses the public key to verify the write instruction received from the BRT 112 (e.g., via protected instruction channel 130), the write instruction is allowed and the file 110 is backed-up to TSR 106 by writing a full copy of file 110 to the TSR 106 of storage device 102. As explained below, with respect to FIG. 2, the backup may simply be a file delta (e.g., 204 or 206 in FIG. 2) comprising data representing a difference between the current version of the file (e.g., V3 in FIG. 2) and the immediately preceding version (e.g., V2 in FIG. 2).

The restore trigger module 118 of BRT 112 may detect a trigger to recover the file 110 from the TSR, for example a malware attack may be detected in file system 108 of storage device 102 by the alert manager module 122 using detection module 132. As explained below, with respect to FIG. 4, the triggers for recovering the file 110 may be based on the presence of a malware attack as detected by detection module 132 and they may require a particular process for recovering the backup file 110 from the TSR 106. For example, if a wide spread ransomware attack is suspected, then the storage device 102 could be formatted using an OS on the storage device 102. As explained above, the TSR 106 could survive such a formatting, after which a new operating system (e.g., including a new BRT 112) could be installed on the formatted storage device 102. Reinstalling a clean version of the OS will result in removal of any ransomware infection in file system 108 of storage device 102.

The recovery manager module 120 then generates a write instruction to the storage device 102 to recover the file 110 from the TSR 106 to the SSR 104 (e.g., write backup copy of file 110 to SSR 104). Optionally, the recovery manager module 120 signs the write instruction with the private key before sending it, so that the storage device 102 could use the public key to verify the authenticity of the write instruction. However, reading data form TSR 106 in order to write the data to SSR 104 may be considered less sensitive since it is unlikely to corrupt the data in TSR 106. Therefore, the protections provided by the protected instruction channel 130 may be sufficient for such write instructions to the SSR 104 of storage device 102 without having to slow down the recovery process in order to verify private key signatures.

Accordingly, the system 100 allows a user to completely recover control of the system 100 and all user data without having to pay any ransom.

Data Structures

Figure 2:
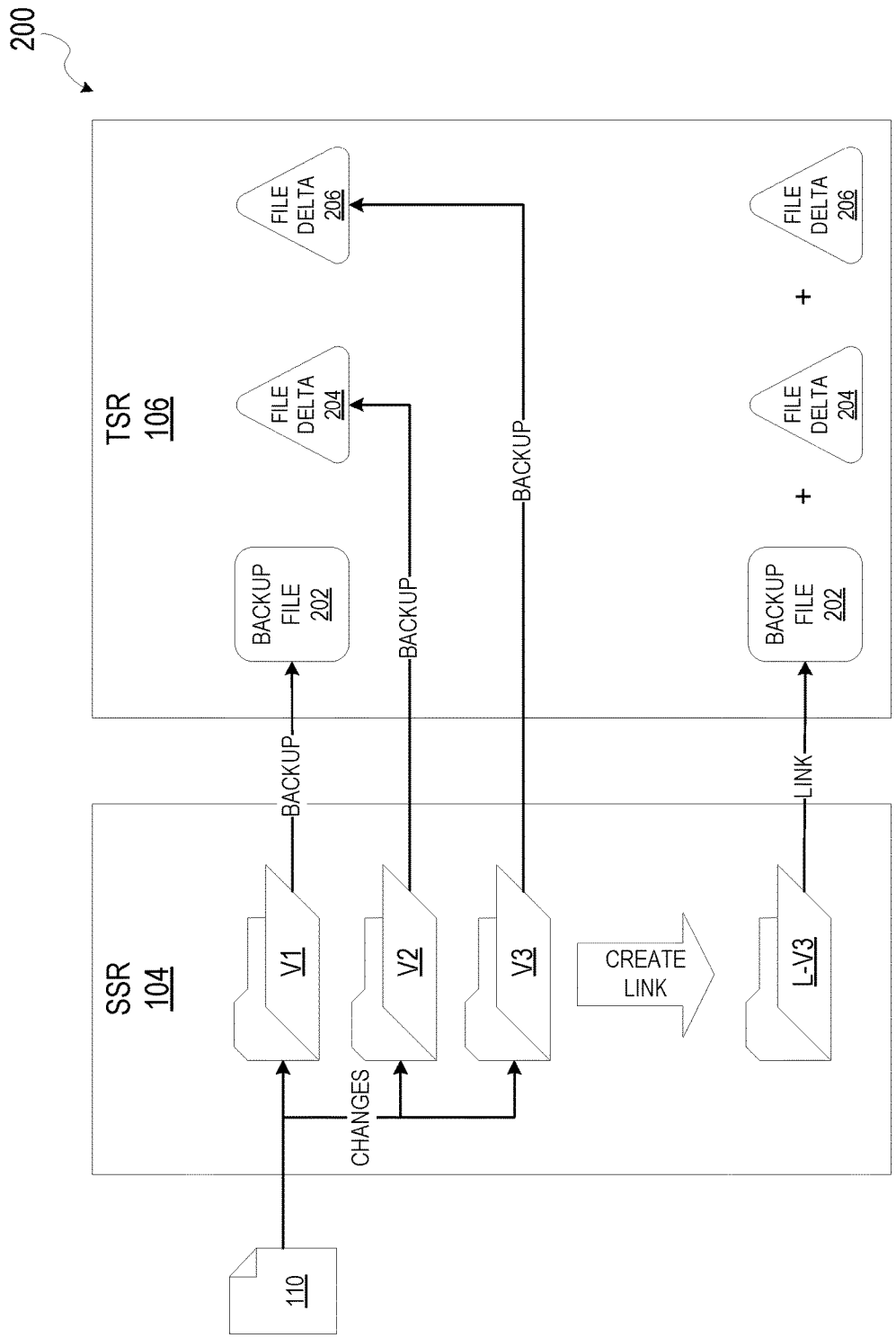
FIG. 2 is a block diagram illustrating a data flow of a system, consistent with some embodiments, configured to optimize storage space when using a trusted storage region to backup file data.

FIG. 2 is a block diagram illustrating a data flow of a system 200, consistent with some embodiments, configured to use a trusted storage region to backup file data using file deltas to optimize storage space. The elements in FIG. 2 include elements from FIG. 1, which elements are labeled with the same identifiers.

The BRT 112 may allow users to create several different types of backups for the file 110, such as full backups, differential backups, and incremental backups. A full backup, like backup file 202, is a complete copy of the file 110 in SSR 104 and may be used to restore the file 110 to the SSR 104 in the version of the file 110 in the SSR at the time the backup file 202 was created, without any need to access any other backup files. Differential and incremental backups only include changes that have occurred to the file 110 over a period of time since the creation of backup file 202, rather than the current full contents of the file 110 in SSR 104. Therefore, each differential and incremental backup requires less storage than a full backup. Differential and incremental backups may be created and managed as part of a sequence of associated file deltas (e.g., 204 and 206), where the sequence includes at least one full backup file 202 that may be used in combination with the file deltas 204 and 206 to restore the file 110 to the SSR 104. Such a sequence of associated backups (e.g., 202, 204 and 206) for file 110 may be combined logically as explained below to recover a version of the file 110 as of the latest backed-up file delta for the file 110. Differential and incremental backups differ in the number of file deltas that are analyzed/processed to restore the file 110 to the SSR 104 as explained below.

In an embodiment, using differential backups, a full backup file 202 may be followed by two differential file deltas 204 and 206. In such an example, the differential file delta 206 would include sufficient information that, when logically combined with the information stored in full backup file 202 (e.g., by implementing any differences, between backup file 202 and file delta 206, on the backup file 202), would allow the file 110 to be recovered to SSR 110 in the version of the file 110 at the time of the creation of file delta 206, In other words, a differential backup contains data on all the changes to the file 110 that have occurred since a previous full backup (e.g., backup file 202) was created.

In an embodiment, using incremental backups, a full backup file 202 may be followed by two incremental file deltas 204 and 206. In such an example, the differential file delta 206 would include information that would be logically combined not only with information contained within backup file 202, but also with information contained within intermediate file delta 204 (e.g., by cumulatively implementing any differences, between backup file 202 and both file delta 204 and file delta 206 in order of creation of the file deltas, on the backup file 202), to restore the version of file 110 as of the date of the creation of file delta 206. In other words, an incremental backup only contains information on the changes to the file 110 in SSR 104 that have occurred since an immediately previous file backup of any kind (full or delta) was created.

In the embodiment of FIG. 2, the BRT 112 has initially backed-up file 110 to the TSR 106 by creating backup file 202 comprising a full copy of the initial version (e.g., V1) of file 110 in SSR 104. The change trigger module 114 of BRT 112 may detect subsequent triggers to back up the file 110, e.g., changes to file 110 that result in multiple versions of the file 110 (e.g., V1, V2 and V3 each time a user closes the file after making changes). The backup manager module 116 creates associated file deltas 204 and 206 comprising the incremental changes to data of file 110 between V1 and V2 and between V2 and V3 respectively. The file deltas 204 and 206 are associated with the original backup file 202 (of file 110) in TSR 106 and they correspond to the multiple versions of the file 110 since it was last backed-up to the TSR 106 (e.g., V2 and V3). The file deltas 204 and 206 (and any other associated file deltas) allow the user to recover file 110 to a last know version (e.g., V1, V2 and V3), which may be the last known safe state before the file 110 was encrypted or infected, e.g., according to the last file delta (e.g., 204, 206, etc.) before a malware attack alert has been issued, as explained below with respect to FIG. 4.

The file deltas 204 and 206 may even assist in detecting a malware attack, because the alert manager module 122 (using detection module 132) may detect a significant change to the file 110 in the SSR 104 by looking at the size of the file deltas 204 and 206. For example, a large size file delta 206 (e.g., within a threshold value of the size of the current version V3 of file 110 in the SSR 104 could indicate that the entire file 110 was encrypted (e.g., changed) and provide an indication of the presence of malware (e.g. ransomware).

As shown, the file 110 is edited in SSR 104, resulting in changes to the file 110 that are represented by the original version V1 (which was backed up to TSR 106 as backup file 202) and subsequent versions V2 and V3 which were backed up the TSR as file deltas 204 and 206 respectively. As noted above, the file deltas (e.g., 206) comprise data representing the difference between the current version of the file 110 (e.g., V3) and the immediately preceding version of file 110 (e.g., V2). In this way the least amount of storage space in TSR 106 is used to backup file 110 in the TSR 106 since this backup procedure does not require full backups of the file 110 for each version (e.g., V1, V2 and V3) and instead only stores file deltas 204 and 206 representing any changes to the file 110 between the versions V1, V2 and V3. For example, if the relative sizes of file 110 in versions V1, V2 and V3 were 500 Kb, 520 Kb and 600 Kb respectively, then backing up all file versions with full backups would require 1120 Kb, while storing one full backup file 202 of 500 Kb together with file deltas 204 and 206, of 20 Kb and 80 Kb respectively, only requires 600 Kb.

The procedure for logically combining the backup file 202 with the associated file deltas 204 and 206 to recover the file 110 to its version (e.g., V3) as of the most recent file delta 206 is described below with respect to FIG. 3.

In another embodiment, the storage space of storage device 102 is further optimized by using the SSR 104 only for files 110 that are currently being accessed by an application through file system 108. In this way the BRT 112 may optimize usage of storage space in storage device 102 by forgoing a normal backup procedure which requires maintaining at least two full copies of the same file 110: the original file 110 (in SSR 104) and backup file 202 (in TSR 106). This requires double the storage capacity in storage device 102. To prevent usage of double the storage space for backups, the BRT 112 uses a "working set" optimization technique. Per this technique, after successfully creating the backup file 202 (and any associated file deltas), the BRT 112 replaces the current file 110 (e.g., V3) in the SSR 104 with a symbolic link L-V3 (e.g., 2 Kb or less in size) to the associated backups (e.g., 202, 204 and 206) of the file 110 in the TSR 106. Continuing with the example sizes from above, since the size of file 110 in version V3 is 600 Kb and the size of the link L-V3 is only 2 Kb, replacing the V3 version of the file 110 in the SSR 104 with the link L-V3 when the file 110 is not being used could save up to 598 Kb of space in storage device 102.

Figure 3:
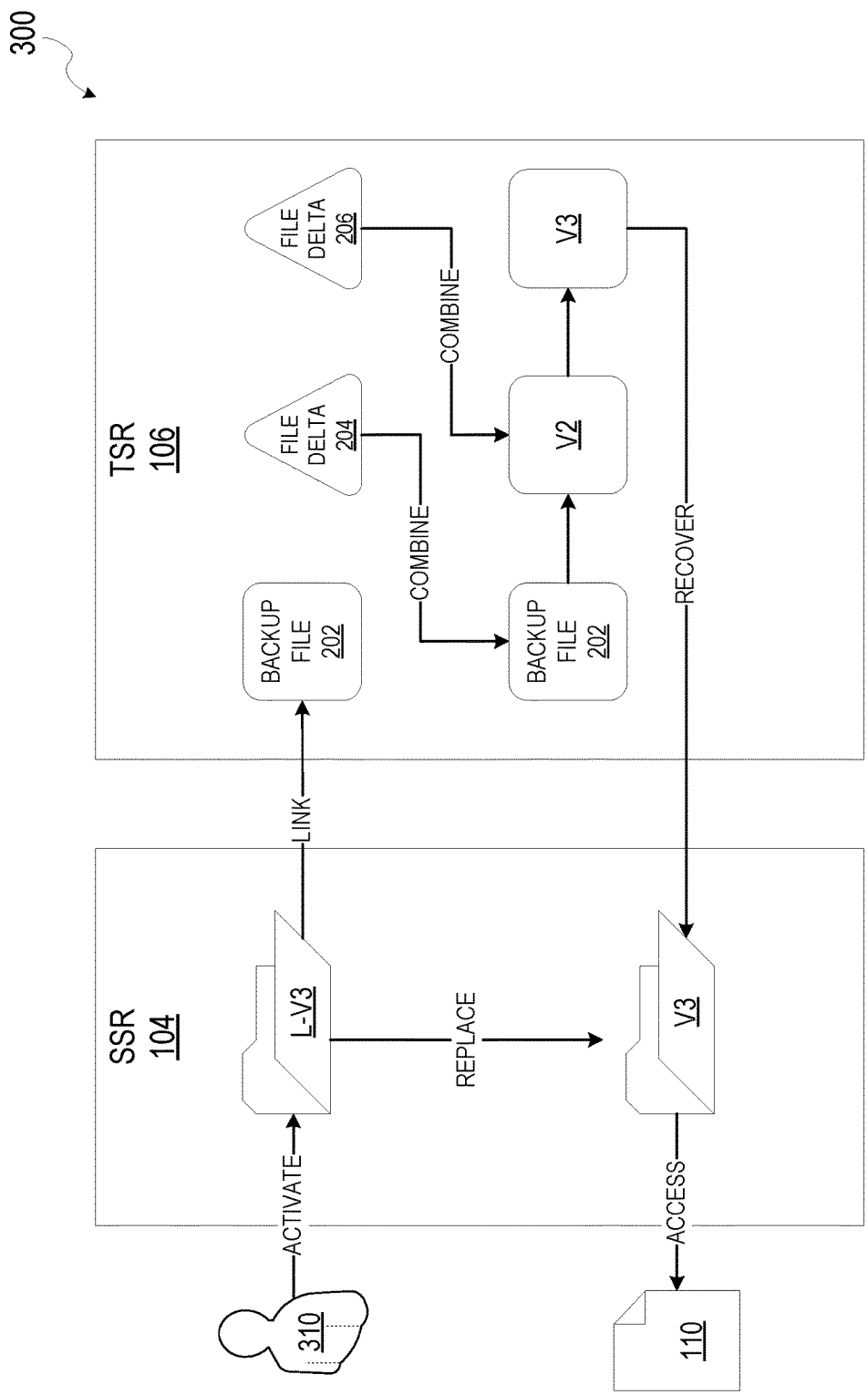
FIG. 3 is a block diagram illustrating a data flow of a system, consistent with some embodiments, configured to use a trusted storage region to recover backed-up file data.

FIG. 3 is a block diagram illustrating a data flow of a system 300, consistent with some embodiments, configured to optimize storage space when using a trusted storage region to backup file data. The elements in FIG. 3 include elements from FIGS. 1 and 2, which elements are labeled with the same identifiers.

When the file system 108 needs to access the file 110 for writing (e.g., a user 310 activates link L-V3), the BRT 112 recovers the V3 version of file 110 (e.g., by logically combining 202, 204 and 206) back to its original location in SSR 104 and removes the link L-V3. Other actions/events that will trigger the recovery of a backed-up file 110 from the TSR 106 are described below with respect to FIG. 4. The BRT 112 recovers the V3 version of file 110 by first combining backup file 202 file and file delta 204 to arrive at version V2 of file 110 and then combining file delta 206 with V2 of file 110 to arrive at version V3 of file 110, which is recovered to SSR 104 (to replace link L-V3) for access by user 310 via the file system 108 of SSR 104.

Figure 4:
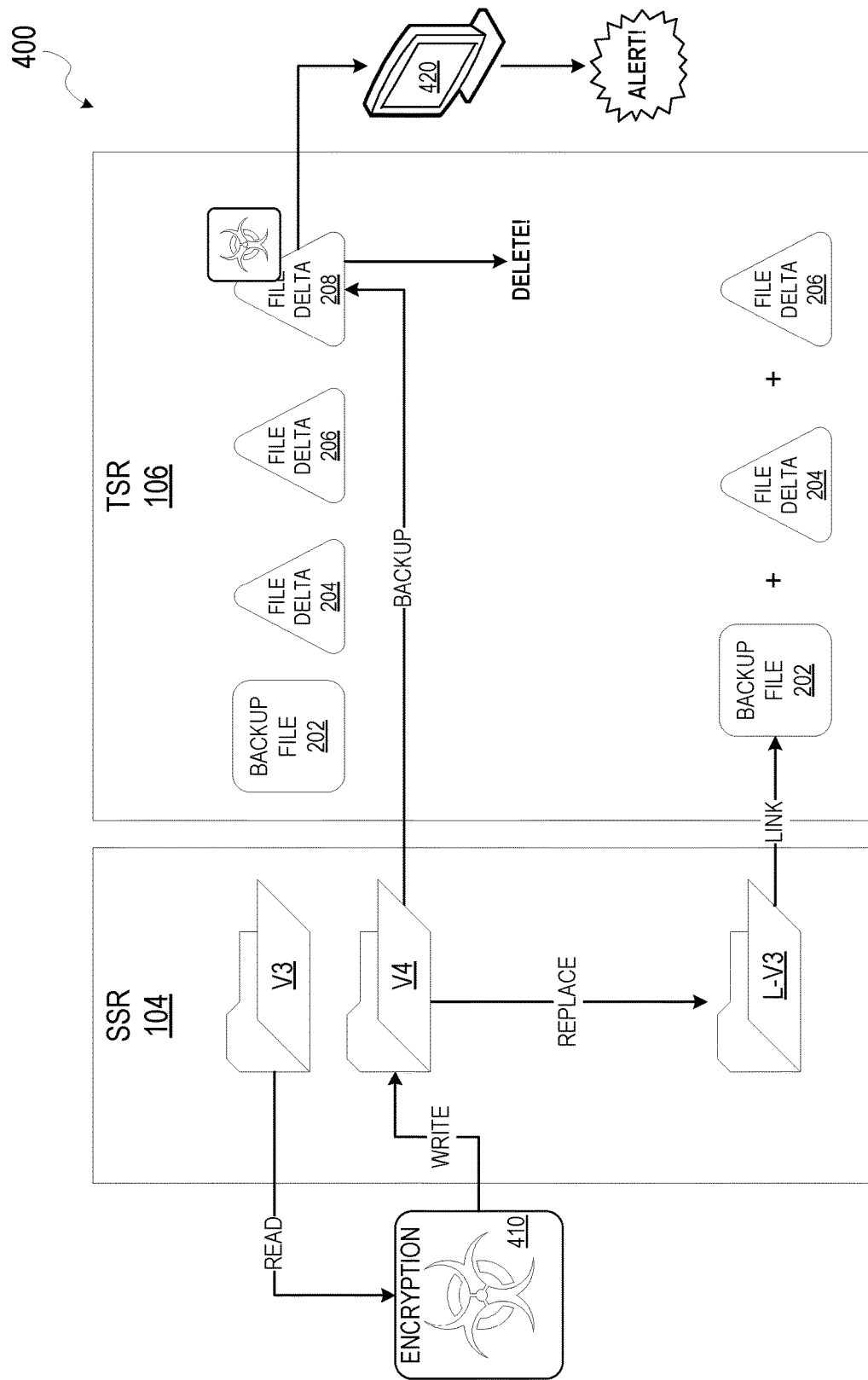
FIG. 4 is a block diagram illustrating a data flow of a system, consistent with some embodiments, configured to detect a malware attack when using a trusted storage region to back up file data.

Afterwards, the user 310, via file system 108, may operate on the recovered version V3 of the file 110 and when done, the BRT 112 may again back up a new version of file 110 (e.g., V4 as a new file delta 208 as shown in FIG. 4) to the TSR 106 and create a link (e.g., L-V4 not shown). As noted above, this technique for using links in the SSR 104 effectively transforms the SSR 104 into a 'working set' area (or cache) with files 110 being removed from the SSR 104 when they are not being actively used/edited (e.g. pictures, old documents etc.) and recovered (e.g., by combining the associated backed-up files 202, 204 and 206) from the TSR 106 to their original location in the SSR 104 when access to the files 110 is requested via activation of the link (e.g., L-V3). In other words, the BRT 112 performs a 'Just In Time Restore' operation which allows applications to seamlessly work with files 110 in file system 108 while applying active, on-going data protection using the TSR 106, in the background.

FIG. 4 is a block diagram illustrating a data flow of a system 400, consistent with some embodiments, configured to detect a malware attack when using a trusted storage region to backup file data. The elements in FIG. 4 include elements from FIGS. 1, 2 and 3, which elements are labeled with the same identifiers.

As shown, the V3 version of file 110 is edited in SSR 104 by a ransomware application 410, resulting in changes to the file 110 (e.g., encryption) represented by the reading of the earlier version V3 (which was backed up to TSR 106 as backup file 202 and associated file deltas 204 and 206) and writing of a subsequent file version V4 which triggered a file delta 208 to be backed up the TSR 106, as described above with respect to FIG. 2. The file delta 208 is stored as associated with original backup file 202, and file deltas 204 and 206. As noted above, the file deltas (e.g., 208) comprise data representing the difference between the current version of the file (e.g., V4) and the immediately preceding version (e.g., V3). In this way, the file deltas 204, 206 and 208 allow for recovery of file 110 to a last know safe version (e.g., V3) before the file 110 was encrypted by ransomware application 410 in version V4.

The alert manager module 122 (using detection module 132) may detect a significant change (e.g., the encryption) to the file 110 in the SSR 104 by examining the size of the file delta 208. If the size of the file delta 208 is too large, such as close to the size of the current file 110 (e.g., V4) in the SSR 104, then a malware alert may be issued by the alert manager module 122. For example, if the size of file delta 208 is within a threshold value of the size of the current version of file 110 (e.g., V4) in the SSR 104, the detection module 132 determines that the version V4 of file 110 (and the corresponding file delta 208) has been infected by malware (e.g., encrypted) and notifies the alert manager module 122 which issues a malware alert, e.g., via a display 420 of system 400.

The large size of the file delta 208 also acts as a trigger for restore trigger module 118 to recover the backed-up file 110 to the last safe version (e.g., V3) backed-up to the TSR 106. The BRT 112 (via recovery manager module 120) then deletes version V4 of the file 110 in the SSR 104 and the corresponding file delta 208 which were determined to be infected by malware. The BRT 112 then re-creates the link L-V3 in SSR 104 in place of the deleted V4 of the file 110. Therefore, any subsequent request to access to file 110 via file system 108 (e.g., by activation of link L-V3) will result in the recovery of the V3 version (since file delta 208 corresponding to V4 was deleted) of file 110 to the SSR 104, since this is the last version prior to the V4 version that was deleted. As noted above, the BRT 112 recovers the V3 version of file 110 by first combining backup file 202 file and delta 204 to arrive at version V2 of file 110 and then combining file delta 206 with V2 of file 110 to arrive at version V3 of file 110. The version V3 of file 110 is then recovered to SSR 104 (to replace link L-V3) for access by user 310. Furthermore, as noted above, the recovery of the backed-up file 110 from the TSR 106 (to a last safe version) may be part of a more complete malware cleansing process, such as a formatting of storage device 102 in order to remove all malware from the storage device 102 before any files 110 are recovered from the TSR 106 to SSR 104.

The trigger for alert manager module 122/restore trigger module 118 may be based on the file 110 comprising a text file and a spell check of the backup file 202 or the file deltas 204 and 206 revealing too many misspelled words (e.g., the words are encrypted). For example, if a spell check of the backup file 202 or the file deltas 204 and 206 reveals a number of misspelled words greater than a threshold value (e.g., more that 50% of the words) then the detection module 132 determines that the file 110 has been encrypted and notifies the alert manager module 122 which issues a malware alert, e.g., via a display 420 of system 400. The numerous misspelled words also trigger the restore trigger module 118 to recover the backed-up file 110 to the last safe version backed-up to the TSR 106 as described above.

The trigger for alert manager module 122/restore trigger module 118 may be based on the file 110 comprising a media file and a value representative of the randomness of data values of the backup file 202 or the file deltas 204 and 206 being greater than a specified threshold value (e.g., not standard image or audio because of lack of patterns). Because the data of the backup file 202 or the file deltas 204 and 206 seems to have been randomized, the detection module 132 determines that the file 110 has been encrypted and notifies the alert manager module 122 which issues a malware alert, e.g., via a display 420 of system 400. The overly random media file data also triggers the restore trigger module 118 to recover the backed-up file 110 to the last safe version backed-up to the TSR 106.

Methods

Figure 5:
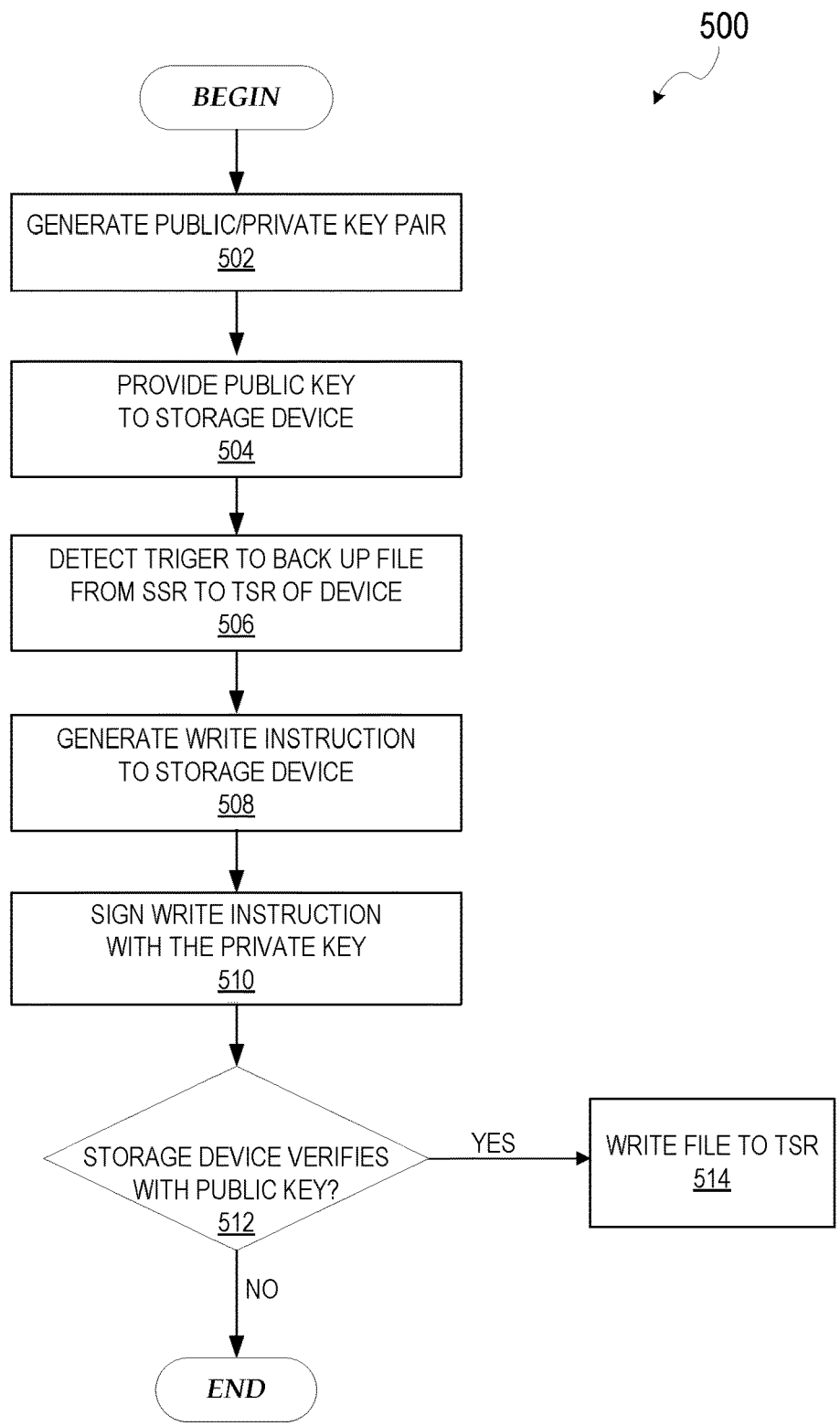
FIG. 5 is a flow diagram illustrating a method, consistent with some embodiments, for using a use a trusted storage region to backup file data.

FIG. 5 is a flow diagram illustrating a method 500, consistent with some embodiments, for using a use a trusted storage region to backup file data. The operations of method 500 are described with respect to the elements of FIGS. 1-4, as described above.

At operation 502, during provisioning (e.g., the initial setup and configuration of the system), the BRT 112 generates a private/public key pair. The private key and the corresponding public key may be, for example, based on a random, non-predictable key pair.

At operation 504, also during the provisioning (or other instance of key generation), the BRT 112 provides the public key to the storage device 102 that includes SSR 104 and TSR 106. As noted, above, the TSR 106 cannot be written (including erasing) by an instruction that is not signed by the private key. Also as noted above, the TSR 106 may be protected from being accessed by hardware and/or firmware of storage device 102. For example, the TSR 106 could be impossible to format (which would erase all data in the TSR 106) by an operating system (OS) installed on the storage device 102.

At operation 506, the change trigger module 114 of the BRT 112 may detect a trigger to back up a file 110 of the file system 108 stored in SSR 104, of storage device 102, to the TSR 106. The trigger to back up the file 110 may be a change to the file 110 in the SSR (e.g., change in data or name of file 110) or the trigger may be the passing of a specified time period since the file 110 was last backed-up from the SSR 104 to the TSR 106.

At operation 508, the backup manager module 116, of BRT 112, generates a write instruction to the storage device 102 to back up the file 110 to the TSR 106. At operation 510, the backup manager module 116 signs the write instruction with the private key generated earlier and sends the write instruction to the storage device 102. As noted above, the BRT 112 may be configured to operate within an SGX enclave (e.g., Intel® Software Guard Extensions (SGX) for the x86 processor architecture) and access the TSR 106, of storage device 102, via a hardware and/or firmware protected instruction channel 130.

At operation 512, the storage device 102 uses the public key to verify the authenticity of the write instruction received from the BRT 112 via backup manager module 116. For example, storage device 102 may include a memory controller that is suitable for this verification purpose. If the private key signature cannot be verified by storage device 102 using the public key then method 500 ends without the write instruction being implemented.

At operation 514, after the storage device 102 uses the public key to verify the write instruction received from the BRT 112 (e.g., via protected instruction channel 130), the write instruction is allowed and the file 110 is backed-up to TSR 106 by writing a copy of file 110 (backup file 202) to the TSR 106 of storage device 102. As explained above, with respect to FIG. 2, the backup may simply be a file delta (e.g., 204 or 206) comprising data representing a difference between the version (e.g., V3) of the file 110 currently in SSR 104 and the previous version of the file (e.g., V2).

Figure 6:
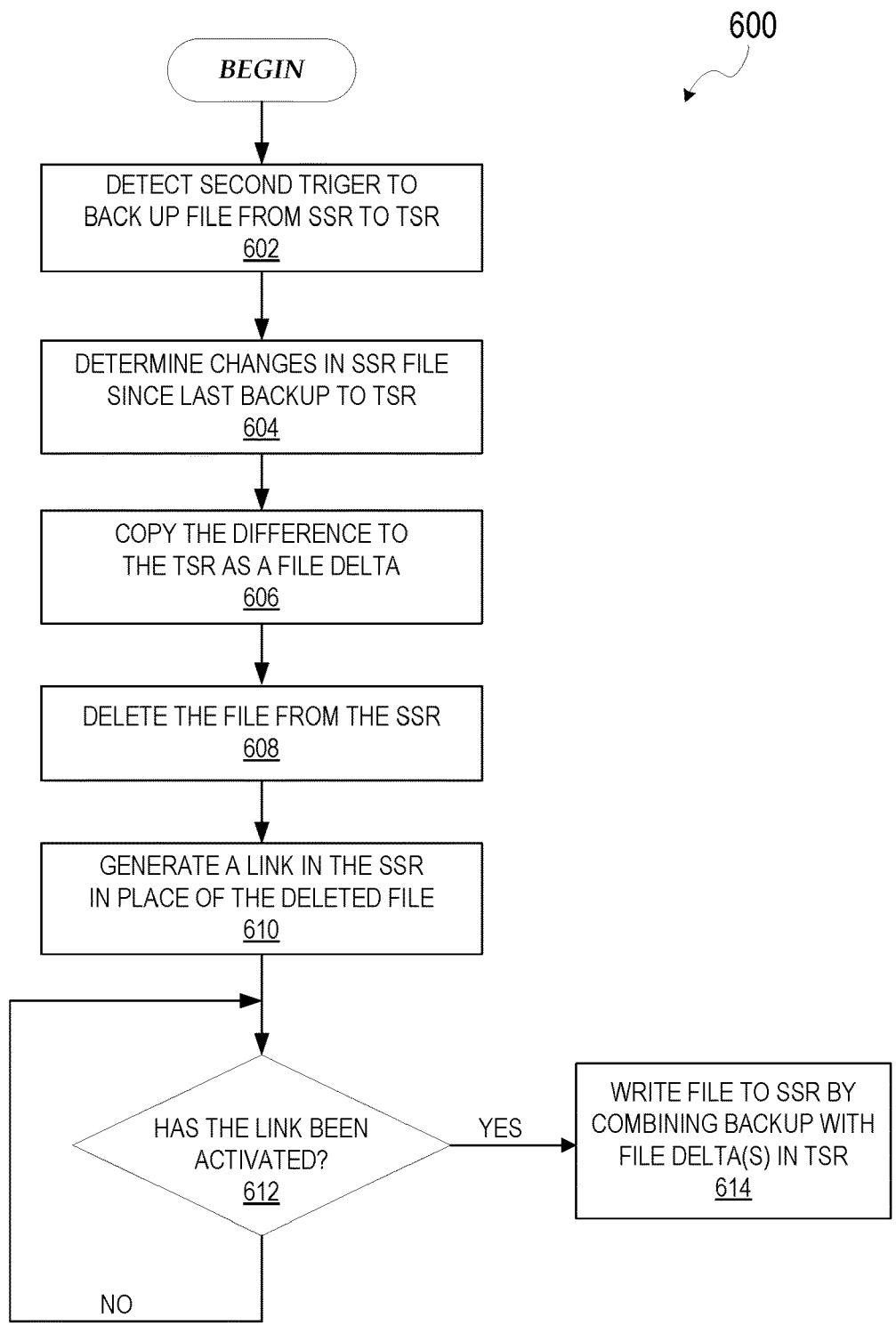
FIG. 6 is a flow diagram illustrating a method, consistent with some embodiments, for optimizing storage space when using a trusted storage region to backup file data.

FIG. 6 is a flow diagram illustrating a method 600, consistent with some embodiments, for optimizing storage space when using a trusted storage region to backup file data. The operations of method 600 are described with respect to the elements of FIGS. 1-4, as described above.

At operation 602, the change trigger module 114 of BRT 112 may detect a trigger (e.g., a first or subsequent trigger) to back up the file 110. As noted above, the trigger may comprise changes to file 110 that result in multiple versions of the file 110, such as versions V1, V2 and V3 each time a user closes the file after making changes.

At operation 604, the change trigger module 114 determines the extent and nature of the incremental changes to the data of file 110 between V1 and V2 and between V2 and V3. At operation 606, the backup manager module 116 creates file deltas 204 and 206 comprising the incremental changes to data of file 110 between V1 and V2 and between V2 and V3. The file deltas 204 and 206 are associated with the original backup file 202 (of file 110) in TSR 106 and they correspond to the multiple versions of the file 110 since it was last backed-up to the TSR 106 (e.g., V2 and V3). As noted above, this backup strategy results in the least amount of storage space in TSR 106 being used to backup file 110 in the TSR 106 since this strategy does not require full backups of the file 110 for each version (e.g., V1, V2 and V3) and instead only stores changes to the file 110 between the versions V1, V2 and V3.

At operation 608, the storage space of storage device 102 is further optimized by having the BRT 112, after successfully creating the backup file 202 and associated file deltas 204 and 206, delete the current file 110 (e.g., V3) in the SSR 104. At operation 610 a symbolic link L-V3 is created to replace version V3 of file 110 in the file system 108 of SSR 104. The link L-V3 points to the associated backups (e.g., 202, 204 and 206) of the file 110 in the TSR 106.

At operation 612, the file system 108 determines if the user (e.g., 310) has activated link L-V3, for example via selecting to operate on file 110 in some local application in storage device 102. At operation 614, based on the link L-V3 having been activated, the BRT 112 recovers the V3 version of file 110 (e.g., by logically combining 202, 204 and 206) back to its original location in SSR 104 and removes the link L-V3. As noted above, the BRT 112 recovers the V3 version of file 110 by first combining backup file 202 file and delta 204 to arrive at version V2 of file 110 and then combining file delta 206 with V2 of file 110 to arrive at version V3 of file 110, which is recovered to SSR 104 (to replace link L-V3) for access by user 310 via the file system 108 of SSR 104.

Figure 7:
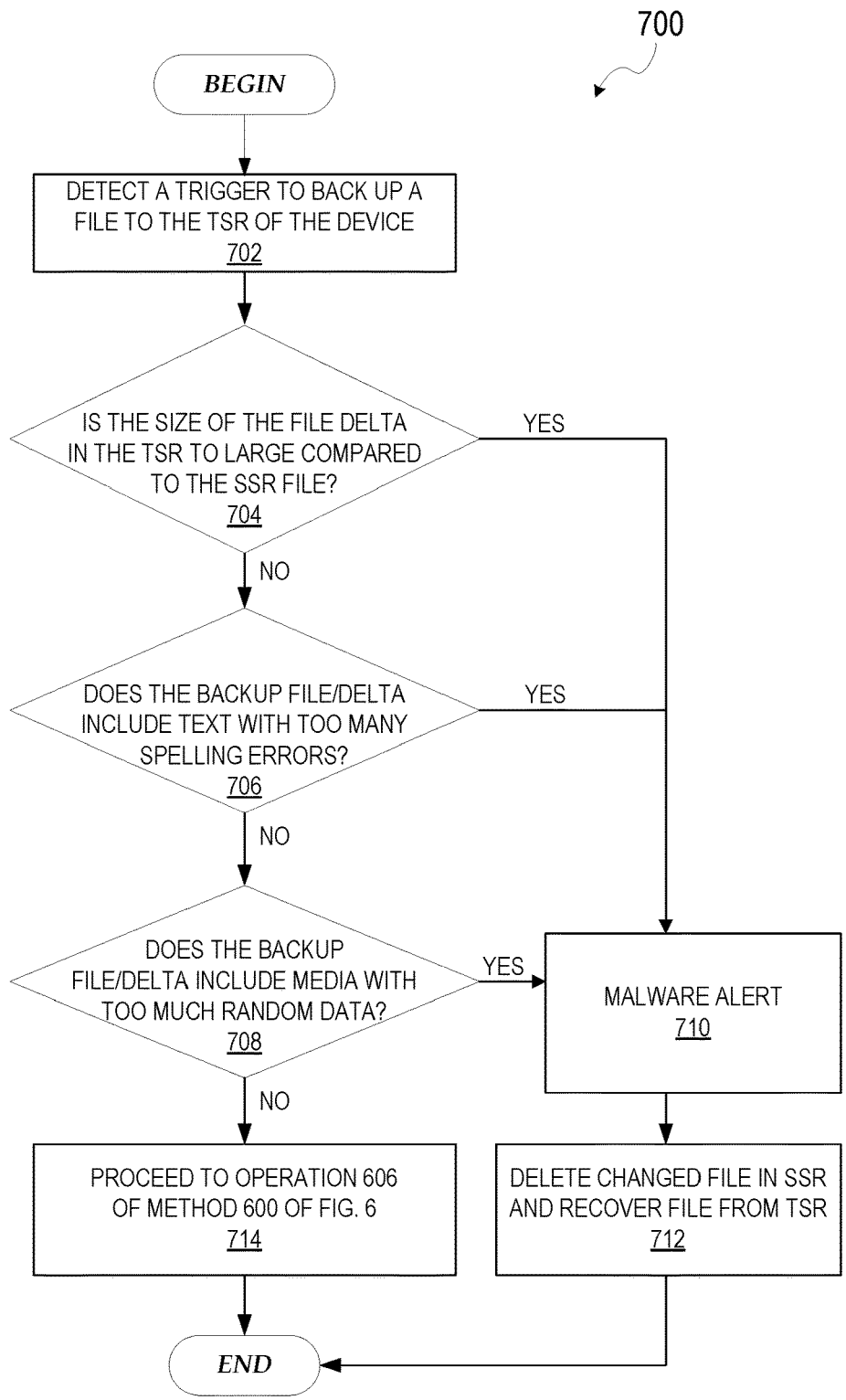
FIG. 7 is a flow diagram illustrating a method, consistent with some embodiments, for detecting a malware attack when using a trusted storage region to backup file data.

FIG. 7 is a flow diagram illustrating a method 700, consistent with some embodiments, for detecting a malware attack when using a trusted storage region to backup file data. The operations of method 500 are described with respect to the elements of FIGS. 1-4, as described above.

At operation 702, changes to the file 110 (e.g., possible encryption) act as a trigger for change trigger module 114 to back up file 110 to the TSR 106. However, based on the detected changes satisfying certain criteria (as determined by detection module 132), the changes may also serve as a trigger for alert manager module 122 to issue a malware alert and for restore trigger module 118 to recover the backed-up file 110 to the last safe version backed-up to the TSR 106. For example, if the nature/extent of the changes indicates that file 110 has been encrypted by malware (e.g., by ransomware application 410).

At operation 704, the trigger for malware alert and/or backup recovery (to the last safe version backed-up to the TSR 106) may be based on the detection module 132 detecting a significant change (e.g., the encryption) to the file 110 in the SSR 104 by examining the size of the file delta 208. If the size of the file delta 208 is too large, such as close to the size of the of the current version of file 110 (e.g., V4) in the SSR 104 then the method 700 continues to operation 710, where a malware alert is issued by the alert manager module 122. For example, if the size of file delta 208 is within a threshold value of the size of the current version of file 110 (e.g., V4) in the SSR 104 the detection module 132 determines that the file 110 has been encrypted and notifies the alert manager module 122 which issues a malware alert, e.g., via a display 420 of system 400.

At operation 706, the trigger for malware alert and/or backup recovery (to the last safe version backed-up to the TSR 106) may be based on the detection module 132 detecting that file 110 in the SSR 104 comprises a text file and that a spell check of the backup file 202 or the file deltas 204 and 206 has revealed too many misspelled words (e.g., the words have been encrypted). For example, if a spell check of the backup file 202 or the file deltas 204 and 206 reveals a number of misspelled words greater than a threshold value (e.g., more that 50% of the words) then the detection module 132 determines that the file 110 has been encrypted and notifies the alert manager module 122 which issues a malware alert, e.g., via a display 420 of system 400 at operation 710. In other embodiments, other types of analysis may be performed to detect a file may have been altered significantly (e.g., encrypted). For example, image-recognition or speech/music recognition can be used to determine that no recognizable image, word or music is present in a respective file of those data types.

At operation 708, the trigger for malware alert and/or backup recovery (to the last safe version backed-up to the TSR 106) may be based on the detection module 132 detecting that the file 110 comprises a media file and that a value representative of the randomness of data values of the backup file 202 or the file deltas 204 and 206 is greater than a specified threshold value (e.g., not standard image or audio because of lack of patterns). Because the data of the backup file 202 or the file deltas 204 and 206 seems to have been randomized, the detection module 132 determines that the file 110 has been encrypted and notifies the alert manager module 122 which issues a malware alert, e.g., via a display 420 of system 400 at operation 710.

In response to any of the above-noted triggers for malware alert and/or backup recovery, at operation 712 the restore trigger module 118 is triggered to recover the backed-up file 110 to the last safe version backed-up to the TSR 106. The BRT 112 (via recovery manager module 120) deletes version V4 of the file 110 in the SSR 104 and the corresponding file delta 208 in TSR 106, which were both determined to be infected by ransomware 410 by one of the operations of method 700 described above. The BRT 112 then re-creates the link L-V3 in SSR 104 in place of the deleted V4 version of the file 110. Thereafter, any request to access the file 110 via file system 108 (e.g., by activation of link L-V3) will result in the recovery of the V3 version (since file delta 208 corresponding to V4 has been deleted) of file 110 to the SSR 104, since this is the last version prior to the V4 version that was determined to be infected by the ransomware 410. As noted above, the recovery of the backed-up file 110 from the TSR 106 (to a last safe version) may be part of a more complete malware cleansing procedure such as a formatting of storage device 102 in order to remove any malware from the storage device 102 before any files 110 are recovered from the TSR 106.

If none of the above-noted triggers for malware alert and/or backup recovery are detected, then at operation 714, the method proceeds to operation 606 of method 600 of FIG. 6 (as described above) so that the file delta 208 may be stored in the TSR 106 to back up file 110 to version V4 which appears to be clean with respect to any malware infection.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art may readily understand how to implement the subject matter in different contexts from the disclosure contained herein.

Software Architecture

Figure 8:
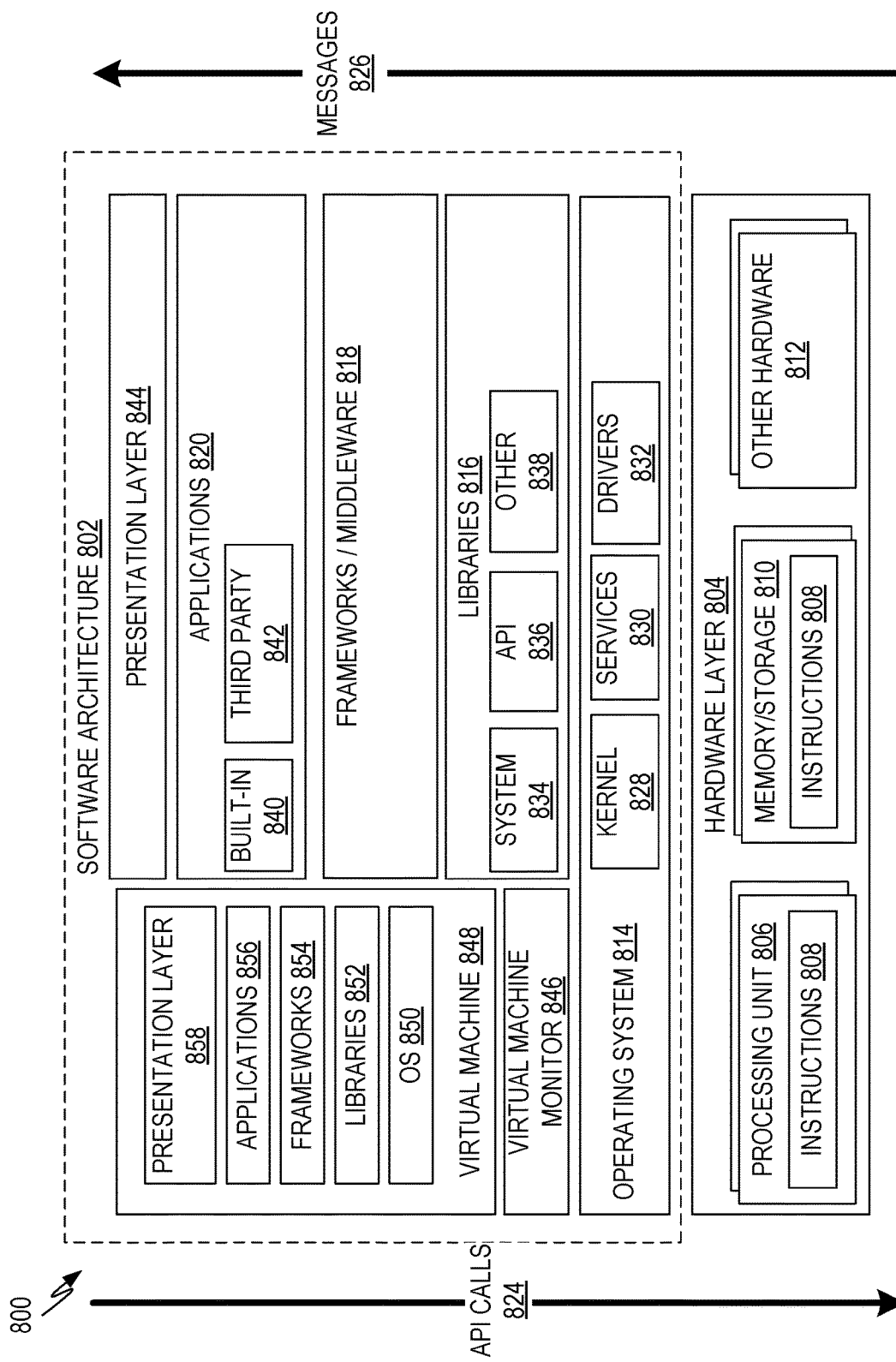
FIG. 8 is a block diagram illustrating an example of a software architecture that may be installed on a machine, according to some example embodiments.

FIG. 8 is a block diagram 800 illustrating an example of a software architecture 802 that may be installed on a machine, according to some example embodiments. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and may represent, for example, the machine 900 of FIG. 9. The representative hardware layer 804 comprises one or more processing units 806 having associated executable instructions 808. The executable instructions 808 represent the executable instructions of the software architecture 802, including implementation of the methods, modules, and so forth of FIGS. 1-7. The hardware layer 804 also includes memory or storage modules 810, which also have the executable instructions 808. The hardware layer 804 may also comprise other hardware 812, which represents any other hardware of the hardware layer 804, such as the other hardware illustrated as part of the machine 900.

In the example architecture of FIG. 8, the software architecture 802 may be conceptualized as a stack of layers, where each layer provides particular functionality. For example, the software architecture 802 may include layers such as an operating system 814, libraries 816, frameworks/ middleware 818, applications 820, and a presentation layer 844. Operationally, the applications 820 or other components within the layers may invoke API calls 824 through the software stack and receive a response, returned values, and so forth (illustrated as messages 826) in response to the API calls 824. The layers illustrated are representative in nature, and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than by interfacing directly with the underlying operating system 814 functionality (e.g., kernel 828, services 830, or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, or a game application.

The third-party applications 842 may include any of the built-in applications 840, as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as the operating system 814 to facilitate functionality described herein.

The applications 820 may utilize built-in operating system functions (e.g., kernel 828, services 830, or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" may be separated from the aspects of the application/module that interact with the user.

Some software architectures utilize virtual machines. In the example of FIG. 8, this is illustrated by a virtual machine 848. A virtual machine creates a software environment where applications/modules may execute as if they were executing on a hardware machine (e.g., the machine 900 of FIG. 9, for example). A virtual machine 848 is hosted by a host operating system (e.g., operating system 814) and typically, although not always, has a virtual machine monitor 846, which manages the operation of the virtual machine 848 as well as the interface with the host operating system (e.g., operating system 814). A software architecture executes within the virtual machine 848, such as an operating system 850, libraries 852, frameworks/middleware 854, applications 856, or a presentation layer 858. These layers of software architecture executing within the virtual machine 848 may be the same as corresponding layers previously described or may be different.

Machine Architecture and Machine-Readable Medium

Figure 9:
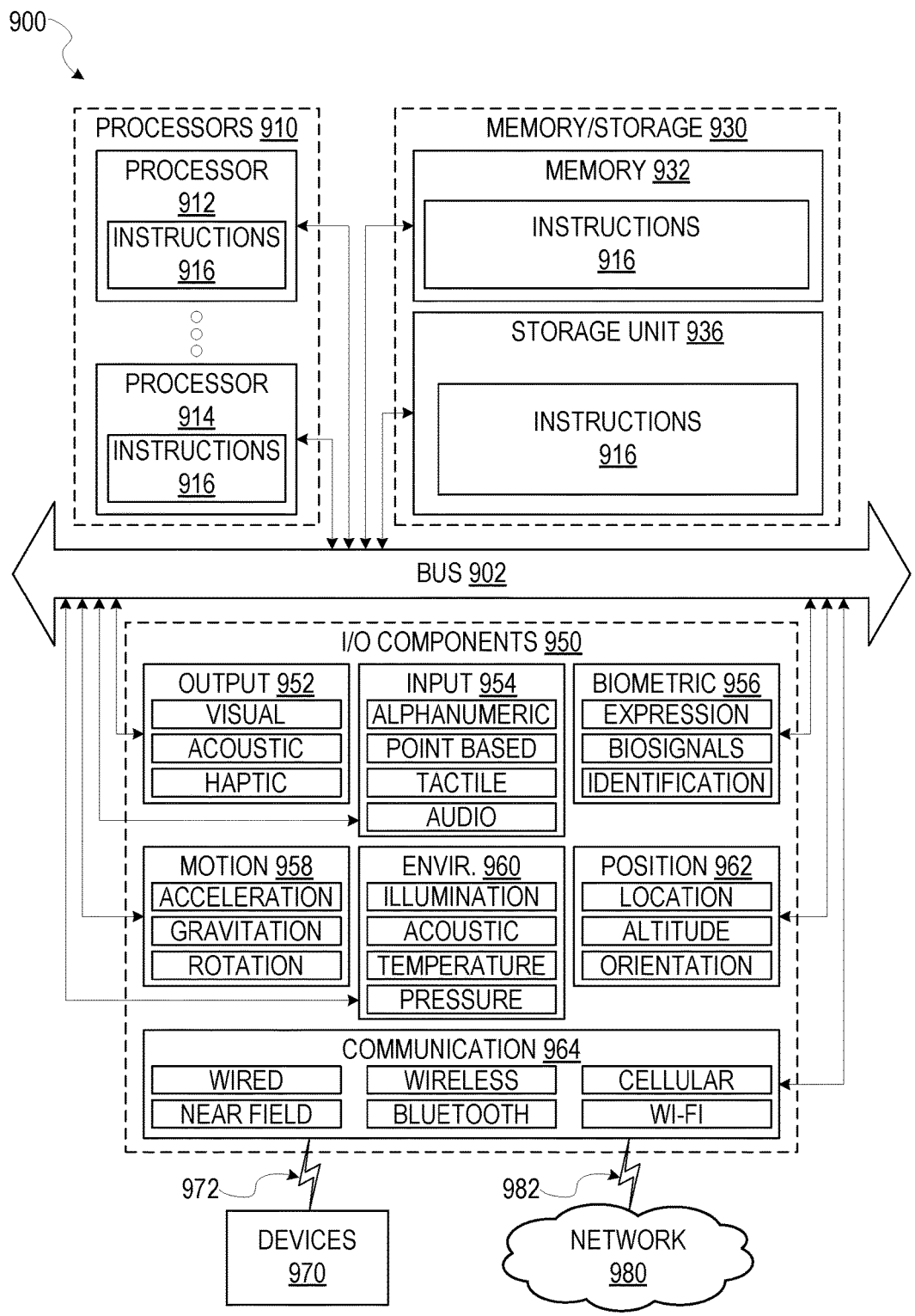
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine in the form of a computer system within which a set of instructions may be executed for causing the machine to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute the method 700 of FIG. 7. Additionally, or alternatively, the instructions 916 may implement FIGS. 1-7, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and the memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-topeer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Additional Notes & Examples

Example 1 is a system for using a trusted storage region to back up files, the system comprising: a processor and a memory coupled to the processor, the memory comprising instructions which, when executed by the processor, cause the processor to: generate a public/private key pair; provide the public key to a storage device comprising a standard storage region (SSR) a trusted storage region (TSR), the TSR not being writable by an instruction that is not signed using the private key; detect a trigger to back up a file in the SSR to the TSR; send a write instruction to the storage device to perform the backup, the write instruction signed using the private key; cause the storage device to verify the private key signature, of the write instruction, using the public key; and write a backup of the file to the TSR based on the private key signature being verified.

In Example 2, the subject matter of Example 1 optionally includes wherein the TSR comprises a region of the storage device which is protected, from being written, by hardware or firmware of the storage device.

In Example 3, the subject matter of any one or more of Examples 1-2 optionally include wherein the trigger to back up the file comprises a change to the file in the SSR or the passing of a specified time period since the file was last backed-up from the SSR to the TSR.

In Example 4, the subject matter of any one or more of Examples 1-3 optionally include the memory further comprising instructions which, when executed by the processor, cause the processor to send the write instruction via a protected instruction channel based on the private key signature, the protected instruction channel providing confidentiality and integrity protection to the private key using hardware or firmware of the system.

In Example 5, the subject matter of any one or more of Examples 1-4 optionally include wherein the TSR cannot be formatted by an operating system (OS) on the storage device, the memory further comprising instructions which, when executed by the processor, cause the processor to: detect a trigger to recover the file from the TSR; format the storage device using the OS; install a new operating system on the formatted storage device; and write the backup of the file from the TSR to the SSR.

In Example 6, the subject matter of Example 5 optionally includes the memory further comprising instructions which, when executed by the processor, cause the processor to: detect a second trigger to back up the file in the SSR to the TSR; determine any changes to the file since it was last backed-up to the TSR; and send a write instruction to the storage device to back up data comprising the changes to the TSR as a file delta associated with the backup of the file, the write instruction signed using the private key.

In Example 7, the subject matter of Example 6 optionally includes wherein to write the backup of the file from the TSR to the SSR, the memory further comprises instructions which, when executed by the processor, cause the processor to: logically combine the backup of the file and the file delta in the TSR; and write the combination from the TSR to the SSR as the backup of the file.

In Example 8, the subject matter of Example 7 optionally includes the memory further comprising instructions which, when executed by the processor, cause the processor to: delete the file in the SSR; generate a link in the SSR in place of the deleted file; and recover the file from the TSR to the SSR based on an activation of the link.

In Example 9, the subject matter of any one or more of Examples 7-8 optionally include wherein the trigger to recover the file comprises: the size of the associated file delta being within a threshold value of the size of the file in the SSR; the file comprising a text file and a spell check of the backup or the file delta including a number of misspelled words greater than a threshold value; or the file comprising a media file and a value representative of the randomness of data values of the backup or the file delta being greater than a specified threshold value.

In Example 10, the subject matter of Example 9 optionally includes wherein: the associated file delta comprises multiple associated file deltas; the trigger to recover the file is detected based on the most recent of the multiple associated file deltas backed-up to the TSR; and to recover the file from the TSR to the SSR, the memory further comprises instructions which, when executed by the processor, cause the processor to: delete the most recent associated file delta; logically combine the backup of the file and the multiple associated file deltas in the TSR, except for the most recent file delta; and write the combination to the SSR as the backup of the file.

In Example 11, the subject matter of Example 10 optionally includes the memory further comprising instructions which, when executed by the processor, cause the processor to: generate a log of the multiple associated file deltas; and send a write instruction to the storage device to store the log to the TSR, the write instruction signed using the private key.

Example 12 is a method of using a trusted storage region to back up files, the method comprising: generating a public/private key pair; providing the public key to a storage device comprising a standard storage region (SSR) a trusted storage region (TSR), the TSR not being writable by an instruction that is not signed using the private key; detecting a trigger to back up a file in the SSR to the TSR; sending a write instruction to the storage device to perform the backup, the write instruction signed using the private key; causing the storage device to verify the private key signature, of the write instruction, using the public key; and writing a backup of the file to the TSR based on the private key signature being verified.

In Example 13, the subject matter of Example 12 optionally includes wherein the TSR comprises a region of the storage device which is protected, from being written, by hardware or firmware of the storage device.

In Example 14, the subject matter of any one or more of Examples 12-13 optionally include wherein the trigger to back up the file comprises a change to the file in the SSR or the passing of a specified time period since the file was last backed-up from the SSR to the TSR.

In Example 15, the subject matter of any one or more of Examples 12-14 optionally include sending the write instruction via a protected instruction channel based on the private key signature, the protected instruction channel providing confidentiality and integrity protection to the private key using hardware or firmware of the system.

In Example 16, the subject matter of any one or more of Examples 12-15 optionally include wherein the TSR cannot be formatted by an operating system (OS) on the storage device, the method further comprising: detecting a trigger to recover the file from the TSR; formatting the storage device using the OS; installing a new operating system on the formatted storage device; and writing the backup of the file from the TSR to the SSR.

In Example 17, the subject matter of Example 16 optionally includes detecting a second trigger to back up the file in the SSR to the TSR; determining any changes to the file since it was last backed-up to the TSR; and sending a write instruction to the storage device to back up data comprising the changes to the TSR as a file delta associated with the backup of the file, the write instruction signed using the private key.

In Example 18, the subject matter of Example 17 optionally includes wherein writing the backup of the file from the TSR to the SSR further comprises: logically combining the backup of the file and the file delta in the TSR; and writing the combination from the TSR to the SSR as the backup of the file.

In Example 19, the subject matter of Example 18 optionally includes deleting the file in the SSR; generating a link in the SSR in place of the deleted file; and recovering the file from the TSR to the SSR based on an activation of the link.

In Example 20, the subject matter of any one or more of Examples 18-19 optionally include wherein the trigger to recover the file comprises: the size of the associated file delta being within a threshold value of the size of the file in the SSR; the file comprising a text file and a spell check of the backup or the file delta including a number of misspelled words greater than a threshold value; or the file comprising a media file and a value representative of the randomness of data values of the backup or the file delta being greater than a specified threshold value.

In Example 21, the subject matter of Example 20 optionally includes wherein: the associated file delta comprises multiple associated file deltas; the trigger to recover the file is detected based on the most recent of the multiple associated file deltas backed-up to the TSR; and recovering the file from the TSR to the SSR further comprises: deleting the most recent associated file delta; logically combining the backup of the file and the multiple associated file deltas in the TSR, except for the most recent file delta; and writing the combination to the SSR as the backup of the file.

In Example 22, the subject matter of Example 21 optionally includes generating a log of the multiple associated file deltas; and sending a write instruction to the storage device to store the log to the TSR, the write instruction signed using the private key.

Example 23 is at least one machine-readable storage medium comprising instructions, which when executed by a processor of a machine, cause the machine to: generate a public/private key pair; provide the public key to a storage device comprising a standard storage region (SSR) a trusted storage region (TSR), the TSR not being writable by an instruction that is not signed using the private key; detect a trigger to back up a file in the SSR to the TSR; send a write instruction to the storage device to perform the backup, the write instruction signed using the private key; cause the storage device to verify the private key signature, of the write instruction, using the public key; and write a backup of the file to the TSR based on the private key signature being verified.

In Example 24, the subject matter of Example 23 optionally includes wherein the TSR comprises a region of the storage device which is protected, from being written, by hardware or firmware of the storage device.

In Example 25, the subject matter of any one or more of Examples 23-24 optionally include wherein the trigger to back up the file comprises a change to the file in the SSR or the passing of a specified time period since the file was last backed-up from the SSR to the TSR.

In Example 26, the subject matter of any one or more of Examples 23-25 optionally include instructions which, when executed by the processor, cause the machine to send the write instruction via a protected instruction channel based on the private key signature, the protected instruction channel providing confidentiality and integrity protection to the private key using hardware or firmware of the system.

In Example 27, the subject matter of any one or more of Examples 23-26 optionally include wherein the TSR cannot be formatted by an operating system (OS) on the storage device, the medium further comprising instructions which, when executed by the processor, cause the machine to: detect a trigger to recover the file from the TSR; format the storage device using the OS; install a new operating system on the formatted storage device; and write the backup of the file from the TSR to the SSR.

In Example 28, the subject matter of Example 27 optionally includes instructions which, when executed by the processor, cause the machine to: detect a second trigger to back up the file in the SSR to the TSR; determine any changes to the file since it was last backed-up to the TSR; and send a write instruction to the storage device to back up data comprising the changes to the TSR as a file delta associated with the backup of the file, the write instruction signed using the private key.

In Example 29, the subject matter of Example 28 optionally includes wherein to write the backup of the file from the TSR to the SSR, the medium further comprises instructions which, when executed by the processor, cause the machine to: logically combine the backup of the file and the file delta in the TSR; and write the combination from the TSR to the SSR as the backup of the file.

In Example 30, the subject matter of any one or more of Examples 28-29 optionally include the medium further comprising instructions which, when executed by the processor, cause the machine to: delete the file in the SSR; generate a link in the SSR in place of the deleted file; and recover the file from the TSR to the SSR based on an activation of the link.

In Example 31, the subject matter of any one or more of Examples 28-30 optionally include wherein the trigger to recover the file comprises: the size of the associated file delta being within a threshold value of the size of the file in the SSR; the file comprising a text file and a spell check of the backup or the file delta including a number of misspelled words greater than a threshold value; or the file comprising a media file and a value representative of the randomness of data values of the backup or the file delta being greater than a specified threshold value.

In Example 32, the subject matter of Example 31 optionally includes wherein: the associated file delta comprises multiple associated file deltas; the trigger to recover the file is detected based on the most recent of the multiple associated file deltas backed-up to the TSR; and to recover the file from the TSR to the SSR, the medium further comprises instructions which, when executed by the processor, cause the machine to: delete the most recent associated file delta; logically combine the backup of the file and the multiple associated file deltas in the TSR, except for the most recent file delta; and write the combination to the SSR as the backup of the file.

In Example 33, the subject matter of Example 32 optionally includes the medium further comprising instructions which, when executed by the processor, cause the machine to: generate a log of the multiple associated file deltas; and send a write instruction to the storage device to store the log to the TSR, the write instruction signed using the private key.

Example 34 is at least one machine-readable medium including instructions, which when executed by a machine, cause the machine to perform operations of any of the methods of Examples 12-22.

Example 35 is an apparatus comprising means for performing any of the methods of Examples 12-22.

Example 36 is an apparatus for using a trusted storage region to back up files, the apparatus comprising: means for generating a public/private key pair; means for providing the public key to a storage device comprising a standard storage region (SSR) a trusted storage region (TSR), the TSR not being writable by an instruction that is not signed using the private key; means for detecting a trigger to back up a file in the SSR to the TSR; means for sending a write instruction to the storage device to perform the backup, the write instruction signed using the private key; means for causing the storage device to verify the private key signature, of the write instruction, using the public key; and means for writing a backup of the file to the TSR based on the private key signature being verified.

In Example 37, the subject matter of Example 36 optionally includes wherein the TSR comprises a region of the storage device which is protected, from being written, by hardware or firmware of the storage device.

In Example 38, the subject matter of any one or more of Examples 36-37 optionally include wherein the trigger to back up the file comprises a change to the file in the SSR or the passing of a specified time period since the file was last backed-up from the SSR to the TSR.

In Example 39, the subject matter of any one or more of Examples 36-38 optionally include sending the write instruction via a protected instruction channel based on the private key signature, the protected instruction channel providing confidentiality and integrity protection to the private key using hardware or firmware of the system.

In Example 40, the subject matter of any one or more of Examples 36-39 optionally include wherein the TSR cannot be formatted by an operating system (OS) on the storage device, the apparatus further comprising: means for detecting a trigger to recover the file from the TSR; means for formatting the storage device using the OS; means for installing a new operating system on the formatted storage device; and means for writing the backup of the file from the TSR to the SSR.

In Example 41, the subject matter of Example 40 optionally includes means for detecting a second trigger to back up the file in the SSR to the TSR; means for determining any changes to the file since it was last backed-up to the TSR; and means for sending a write instruction to the storage device to back up data comprising the changes to the TSR as a file delta associated with the backup of the file, the write instruction signed using the private key.

In Example 42, the subject matter of Example 41 optionally includes wherein the means for writing the backup of the file from the TSR to the SSR further comprise: means for logically combining the backup of the file and the file delta in the TSR; and means for writing the combination from the TSR to the SSR as the backup of the file.

In Example 43, the subject matter of Example 42 optionally includes means for deleting the file in the SSR; means for generating a link in the SSR in place of the deleted file; and means for recovering the file from the TSR to the SSR based on an activation of the link.

In Example 44, the subject matter of any one or more of Examples 42-43 optionally include wherein the trigger to recover the file comprises: the size of the associated file delta being within a threshold value of the size of the file in the SSR; the file comprising a text file and a spell check of the backup or the file delta including a number of misspelled words greater than a threshold value; or the file comprising a media file and a value representative of the randomness of data values of the backup or the file delta being greater than a specified threshold value.

In Example 45, the subject matter of Example 44 optionally includes wherein: the associated file delta comprises multiple associated file deltas; the trigger to recover the file is detected based on the most recent of the multiple associated file deltas backed-up to the TSR; and the means for recovering the file from the TSR to the SSR further comprise: means for deleting the most recent associated file delta; means for logically combining the backup of the file and the multiple associated file deltas in the TSR, except for the most recent file delta; and means for writing the combination to the SSR as the backup of the file.

In Example 46, the subject matter of Example 45 optionally includes means for generating a log of the multiple associated file deltas; and means for sending a write instruction to the storage device to store the log to the TSR, the write instruction signed using the private key.

Example 47 is a system for using a trusted storage region to back up files, the system comprising: a backup and replacement tool (BRT) configured to: generate a public/private key pair; provide the public key to a storage device comprising a standard storage region (SSR) a trusted storage region (TSR), the TSR not being writable by an instruction that is not signed using the private key; detect a trigger to back up a file in the SSR to the TSR; and send a write instruction to the storage device to perform the backup, the write instruction signed using the private key; and a memory controller configured to cause the storage device to: verify the private key signature, of the write instruction, using the public key; and write a backup of the file to the TSR based on the private key signature being verified.

In Example 48, the subject matter of Example 47 optionally includes wherein the TSR comprises a region of the storage device which is protected, from being written, by hardware or firmware of the storage device.

In Example 49, the subject matter of any one or more of Examples 47-48 optionally include wherein the trigger to back up the file comprises a change to the file in the SSR or the passing of a specified time period since the file was last backed-up from the SSR to the TSR.

In Example 50, the subject matter of any one or more of Examples 47-49 optionally include the BRT further configured to send the write instruction via a protected instruction channel based on the private key signature, the protected instruction channel providing confidentiality and integrity protection to the private key using hardware or firmware of the system.

In Example 51, the subject matter of any one or more of Examples 47-50 optionally include wherein the TSR cannot be formatted by an operating system (OS) on the storage device, the BRT further configured to: detect a trigger to recover the file from the TSR; format the storage device using the OS; install a new operating system on the formatted storage device; and write the backup of the file from the TSR to the SSR.

In Example 52, the subject matter of Example 51 optionally includes the BRT further configured to: detect a second trigger to back up the file in the SSR to the TSR; determine any changes to the file since it was last backed-up to the TSR; and send a write instruction to the storage device to back up data comprising the changes to the TSR as a file delta associated with the backup of the file, the write instruction signed using the private key.

In Example 53, the subject matter of Example 52 optionally includes wherein to write the backup of the file from the TSR to the SSR, the BRT is further configured to: logically combine the backup of the file and the file delta in the TSR; and write the combination from the TSR to the SSR as the backup of the file.

In Example 54, the subject matter of Example 53 optionally includes the BRT further configured to: delete the file in the SSR; generate a link in the SSR in place of the deleted file; and recover the file from the TSR to the SSR based on an activation of the link.

In Example 55, the subject matter of any one or more of Examples 53-54 optionally include wherein the trigger to recover the file comprises: the size of the associated file delta being within a threshold value of the size of the file in the SSR; the file comprising a text file and a spell check of the backup or the file delta including a number of misspelled words greater than a threshold value; or the file comprising a media file and a value representative of the randomness of data values of the backup or the file delta being greater than a specified threshold value.

In Example 56, the subject matter of Example 55 optionally includes wherein: the associated file delta comprises multiple associated file deltas; the trigger to recover the file is detected based on the most recent of the multiple associated file deltas backed-up to the TSR; and to recover the file from the TSR to the SSR, the BRT is further configured to: delete the most recent associated file delta; logically combine the backup of the file and the multiple associated file deltas in the TSR, except for the most recent file delta; and write the combination to the SSR as the backup of the file.

In Example 57, the subject matter of Example 56 optionally includes the BRT further configured to: generate a log of the multiple associated file deltas; and send a write instruction to the storage device to store the log to the TSR, the write instruction signed using the private key.

Language

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for using a trusted storage region to back up files, the system comprising:
   a processor and a memory coupled to the processor, the memory comprising instructions which, when executed by the processor, cause the processor to:
   execute a backup recovery process in a secure enclave provided by the processor, backup recovery process causing the processor to:
   generate a public/private key pair;
   provide the public key to a storage device comprising a standard storage region (SSR) a trusted storage region (TSR), the TSR not being writable by an instruction that is not signed using the private key;
   detect a trigger to back up a file in the SSR to the TSR;
   send a write instruction to the storage device to perform the backup, the write instruction signed using the private key;
   cause the storage device to verify the private key signature, of the write instruction, using the public key; and
   write a backup of the file to the TSR based on the private key signature being verified, wherein the TSR cannot be formatted by an operating system (OS) on the storage device, the memory further comprising instructions which, when executed by the processor, cause the processor to:
   detect a trigger to recover the file from the TSR;
   format the storage device using the OS;

install a new operating system on the formatted storage device; and write the backup of the file from the TSR to the SSR.

2. The system of claim 1, wherein the TSR comprises a region of the storage device which is protected, from being written, by hardware or firmware of the storage device.

3. The system of claim 1, wherein the trigger to back up the file comprises a change to the file in the SSR or the passing of a specified time period since the file was last backed-up from the SSR to the TSR.

4. The system of claim 1, the memory further comprising instructions which, when executed by the processor, cause the processor to send the write instruction via a protected instruction channel based on the private key signature, the protected instruction channel providing confidentiality and integrity protection to the private key using hardware or firmware of the system.

5. The system of claim 1, the memory further comprising instructions which, when executed by the processor, cause the processor to:

detect a second trigger to back up the file in the SSR to the TSR;

determine any changes to the file since it was last backed-up to the TSR; and send a write instruction to the storage device to back up data comprising the changes to the TSR as a file delta associated with the backup of the file, the write instruction signed using the private key.

6. The system of claim 5, wherein to write the backup of the file from the TSR to the SSR, the memory further comprises instructions which, when executed by the processor, cause the processor to:

logically combine the backup of the file and the file delta in the TSR; and write the combination from the TSR to the SSR as the backup of the file.

7. The system of claim 6, the memory further comprising instructions which, when executed by the processor, cause the processor to:

delete the file in the SSR;

generate a link in the SSR in place of the deleted file; and recover the file from the TSR to the SSR based on an activation of the link.

8. The system of claim 6, wherein the trigger to recover the file comprises:

the size of the associated file delta being within a threshold value of the size of the file in the SSR;

the file comprising a text file and a spell check of the backup or the file delta including a number of misspelled words greater than a threshold value; or the file comprising a media file and a value representative of the randomness of data values of the backup or the file delta being greater than a specified threshold value.

9. The system of claim 8, wherein:

the associated file delta comprises multiple associated file deltas;

the trigger to recover the file is detected based on the most recent of the multiple associated file deltas backed-up to the TSR; and to recover the file from the TSR to the SSR, the memory further comprises instructions which, when executed by the processor, cause the processor to:

delete the most recent associated file delta;

logically combine the backup of the file and the multiple associated file deltas in the TSR, except for the most recent file delta; and write the combination to the SSR as the backup of the file.

10. The system of claim 9, the memory further comprising instructions which, when executed by the processor, cause the processor to:

generate a log of the multiple associated file deltas; and send a write instruction to the storage device to store the log to the TSR, the write instruction signed using the private key.

11. A method of using a trusted storage region to back up files, the method comprising:

executing a backup recovery process in a secure enclave provided by the processor, backup recovery process causing the processor to generating a public/private key pair;

providing the public key to a storage device comprising a standard storage region (SSR) a trusted storage region (TSR), the TSR not being writable by an instruction that is not signed using the private key;

detecting a trigger to back up a file in the SSR to the TSR;

sending a write instruction to the storage device to perform the backup, the write instruction signed using the private key;

causing the storage device to verily the private key signature, of the write instruction, using the public key; and writing a backup of the file to the TSR based on the private key signature being verified, wherein the TSR cannot be formatted by an operating system (OS) on the storage device, the method further comprising:

detecting a trigger to recover the file from the TSR;

formatting the storage device using the OS;

installing a new operating system on the formatted storage device; and writing the backup of the file from the TSR to the SSR.

12. The method of claim 11, wherein the TSR comprises a region of the storage device which is protected, from being written, by hardware or firmware of the storage device.

13. The method of claim 11, wherein the trigger to back up the file comprises a change to the file in the SSR or the passing of a specified time period since the file was last backed-up from the SSR to the TSR.

14. The method of claim 11, further comprising sending the write instruction via a protected instruction channel based on the private key signature, the protected instruction channel providing confidentiality and integrity protection to the private key using hardware or firmware of the system.

15. The method of claim 11, further comprising:

detecting a second trigger to back up the file in the SSR to the TSR;

determining any changes to the file since it was last backed-up to the TSR; and sending a write instruction to the storage device to back up data comprising the changes to the TSR as a file delta associated with the backup of the file, the write instruction signed using the private key.

16. The method of claim 15, wherein writing the backup of the file from the TSR to the SSR further comprises:

logically combining the backup of the file and the file delta in the TSR; and writing the combination from the TSR to the SSR as the backup of the file.

17. The method of claim 16, further comprising:

deleting the file in the SSR;

generating a link in the SSR in place of the deleted file; and recovering the file from the TSR to the SSR based on an activation of the link.

18. The method of claim 16, wherein the trigger to recover the file comprises:
   the size of the associated file delta being within a threshold value of the size of the file in the SSR;
   the file comprising a text file and a spell check of the backup or the file delta including a number of misspelled words greater than a threshold value; or
   the file comprising a media file and a value representative of the randomness of data values of the backup or the file delta being greater than a specified threshold value.

19. The method of claim 18, wherein:
   the associated file delta comprises multiple associated file deltas;
   the trigger to recover the file is detected based on the most recent of the multiple associated file deltas backed-up to the TSR; and
   recovering the file from the TSR to the SSR further comprises:
      deleting the most recent associated file delta;
      logically combining the backup of the file and the multiple associated file deltas in the TSR, except for the most recent file delta; and
      writing the combination to the SSR as the backup of the file.

20. The method of claim 19, further comprising:
   generating a log of the multiple associated file deltas; and
   sending a write instruction to the storage device to store the log to the TSR, the write instruction signed using the private key.

21. At least one non-transitory machine-readable storage medium comprising instructions, which when executed by a processor of a machine, cause the machine to:
   execute a backup recovery process in a secure enclave provided by the processor, backup recovery process causing the processor to
      generate a public/private key pair;
      provide the public key to a storage device comprising a standard storage region (SSR) a trusted storage region (TSR), the TSR not being writable by an instruction that is not signed using the private key;
      detect a trigger to back up a file in the SSR to the TSR;
      send a write instruction to the storage device to perform the backup, the write instruction signed using the private key;
      cause the storage device to verify the private key signature, of the write instruction, using the public key; and
      write a backup of the file to the TSR based on the private key signature being verified, wherein the TSR cannot be formatted by an operating system (OS) on the storage device, the medium further comprising instructions which, when executed by the processor, cause the machine to:
   detect a trigger to recover the file from the TSR;
   format the storage device using the OS;
   install a new operating system on the formatted storage device; and
   write the backup of the file from the TSR to the SSR.

22. The machine-readable storage medium of claim 21, further comprising instructions which, when executed by the processor, cause the machine to:
   detect a second trigger to back up the file in the SSR to the TSR;
   determine any changes to the file since it was last backed-up to the TSR;
   send a write instruction to the storage device to back up data comprising the changes to the TSR as a file delta associated with the backup of the file, the write instruction signed using the private key;
   write the backup of the file from the TSR to the SSR by:
      logically combining the backup and the file delta in the TSR; and
      writing the combination to the SSR as the backup of the file.

* * * * *

UNITED STATES PATENT AND TRADEMARK OFFICE
CERTIFICATE OF CORRECTION

PATENT NO. : 10,116,451 B2
APPLICATION NO. : 15/349410
DATED : October 30, 2018
INVENTOR(S) : Kadam et al.

Page 1 of 1

It is certified that error appears in the above-identified patent and that said Letters Patent is hereby corrected as shown below:

In the Claims

In Column 26, Line 58, in Claim 1, delete "verily" and insert --verify-- therefor In Column 28, Line 14, in Claim 11, after "to", insert --:--

In Column 28, Line 25, in Claim 11, delete "verily" and insert --verify-- therefor In Column 29, Line 39, in Claim 21, after "to", insert --:--

Signed and Sealed this
Eighth Day of February, 2022

Drew Hirshfeld
*Performing the Functions and Duties of the
Under Secretary of Commerce for Intellectual Property and
Director of the United States Patent and Trademark Office*